(12) United States Patent
Otaka et al.

(10) Patent No.: US 7,583,285 B2
(45) Date of Patent: Sep. 1, 2009

(54) MOBILE COMMUNICATION TERMINAL

(75) Inventors: Osamu Otaka, Tokyo (JP); Mineko Moroto, Tokyo (JP); Norioki Watanabe, Tokyo (JP); Shinichiro Ide, Chiba (JP); Satoshi Ogawa, Gifu (JP)

(73) Assignee: Vodafone Group PLC, Newbury, Berkshire (GB)

( * ) Notice: Subject to any disclaimer, the term of this patent is extended or adjusted under 35 U.S.C. 154(b) by 335 days.

(21) Appl. No.: 10/557,287

(22) PCT Filed: May 18, 2004

(86) PCT No.: PCT/JP2004/006650

§ 371 (c)(1),
(2), (4) Date: Nov. 18, 2005

(87) PCT Pub. No.: WO2004/102931

PCT Pub. Date: Nov. 25, 2004

(65) Prior Publication Data

US 2006/0232662 A1  Oct. 19, 2006

(30) Foreign Application Priority Data

May 19, 2003  (JP)  ............................. 2003-139866

(51) Int. Cl.
*H04N 7/14* (2006.01)
(52) U.S. Cl. .................................... 348/14.01; 382/183
(58) Field of Classification Search ................. 345/810, 345/738; 705/408; 382/183; 455/414, 41
See application file for complete search history.

(56) References Cited

U.S. PATENT DOCUMENTS 6,330,975 B1 * 12/2001 Bunte et al. ................. 235/470

7,088,859 B1 * 8/2006 Yamaguchi et al. ......... 382/181

(Continued)

FOREIGN PATENT DOCUMENTS

JP  07-296099  11/1995

(Continued)

OTHER PUBLICATIONS

NTT Docomo Inc., "i Appli Contents Kaihatsu Guide for DoJa-3.0 -i Appli Option • i Appli Kakuchohen-," edition 1.0, Apr. 17, 2003, http://www.nttdocomo.co.jp/p_s/imode/java/pdf/jguidefordoja3_0_opt_030417.pdf.

(Continued)

*Primary Examiner*—Curtis Kuntz
*Assistant Examiner*—Maria El-Zoobi
(74) *Attorney, Agent, or Firm*—Muirhead and Saturnelli, LLC

(57) ABSTRACT

A mobile communication terminal is provided that is capable of shooting a code image, restoring data from the code image, and using the shot code image and the restored data, in response to a request from an application program. A mobile communication terminal (mobile phone) includes an image shooting unit for shooting an image; a data memory unit for memorizing data of a code image shot by the image shooting unit; a main control unit for controlling the image shooting unit and the data memory unit; and an application program executing and managing unit for executing an application program registered by a user. The main control unit controls the image shooting unit and the data memory unit based on a control request instruction sent from the application program executing and managing unit that is executing the application program.

23 Claims, 10 Drawing Sheets

U.S. PATENT DOCUMENTS

| | | |
|---|---|---|
| 2002/0006786 A1* | 1/2002 | Mine .......................... 455/414 |
| 2002/0047867 A1* | 4/2002 | Mault et al. ................. 345/810 |
| 2002/0083022 A1* | 6/2002 | Algazi ........................ 705/408 |
| 2003/0014315 A1* | 1/2003 | Jaalinoja et al. ............... 705/18 |
| 2003/0198383 A1* | 10/2003 | Yamaguchi et al. ......... 382/183 |
| 2003/0214529 A1* | 11/2003 | Martin et al. ............... 345/738 |
| 2004/0017945 A1* | 1/2004 | Ihara et al. .................. 382/182 |
| 2004/0111320 A1* | 6/2004 | Schlieffers et al. ............ 705/16 |
| 2006/0113390 A1* | 6/2006 | Muramatsu ............ 235/462.27 |
| 2006/0262012 A1* | 11/2006 | Nishikata et al. ....... 342/357.11 |

FOREIGN PATENT DOCUMENTS

| | | |
|---|---|---|
| JP | 10-208001 | 8/1998 |
| JP | 2000-347867 | 12/2000 |
| JP | 2003-06570 | 1/2003 |

OTHER PUBLICATIONS

Sekiguchi, Kiyoshi, "Docomo, 505i de Saiyo Sareta i Appli no. Shinshiyo o Kokai," Apr. 21, 2003, Impress, Ketai Watch, http://k-tai.impress.co.jp/cda/article/news_toppage/13676.html.

Naruse, Naoki, "Camera-Java Kino Renkei ni yoru Shin Service," NTT Docomo Inc., Technical Journal, Jan. 1, 2003, vol. 10., No. 4.

* cited by examiner

[FIG. 4]
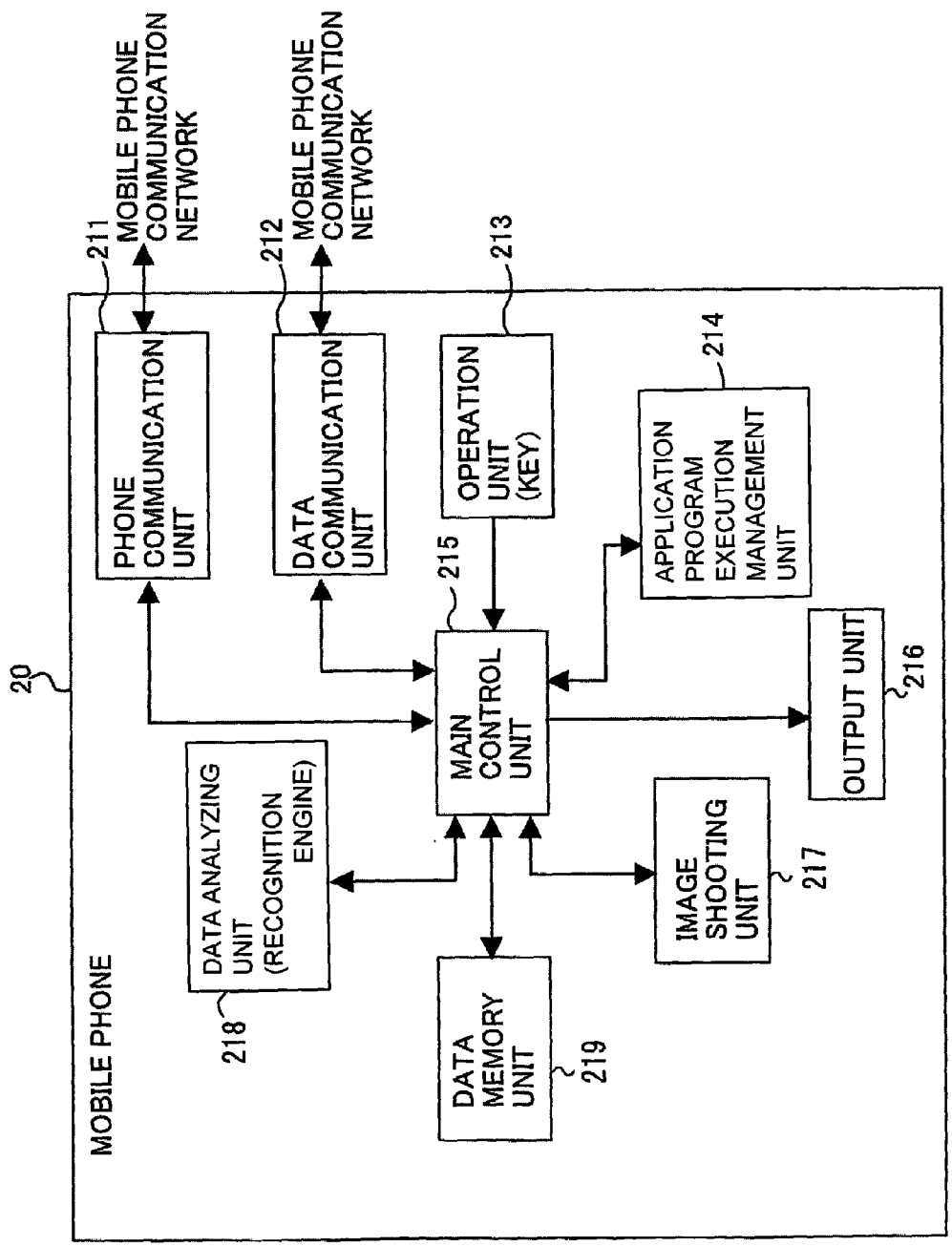

[FIG. 5]
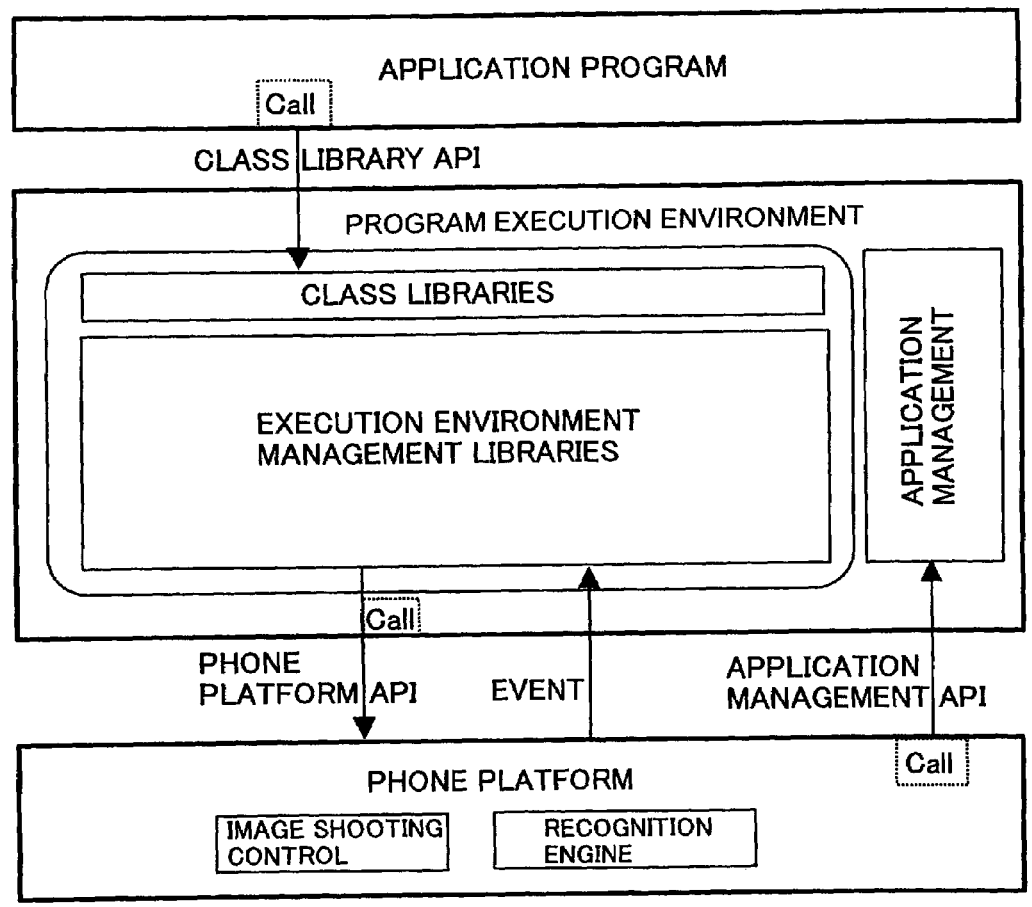

FIG. 7

| STANDARD HEADER PART | MODE INDICATOR |
| --- | --- |
| | INDICATOR FOR THE NUMBER OF CHARACTERS |
| EXTENSION HEADER PART | EXTENSION HEADER IDENTIFIER |
| | MAKER IDENTIFIER |
| | QR CODE EXTENSION VERSION IDENTIFIER |
| | ENCRYPTION IDENTIFIER |
| | ENCRYPTION ALGORITHM VERSION IDENTIFIER |
| | COPYRIGHT IDENTIFIER |
| DATA PART | DATA TYPE IDENTIFIER |
| | DATA LENGTH |
| | DATA BODY |
| | DATA TYPE IDENTIFIER |
| | DATA LENGTH |
| | DATA BODY |
| | ... |
| | ... |
| | END PATTERN |

[FIG. 8]
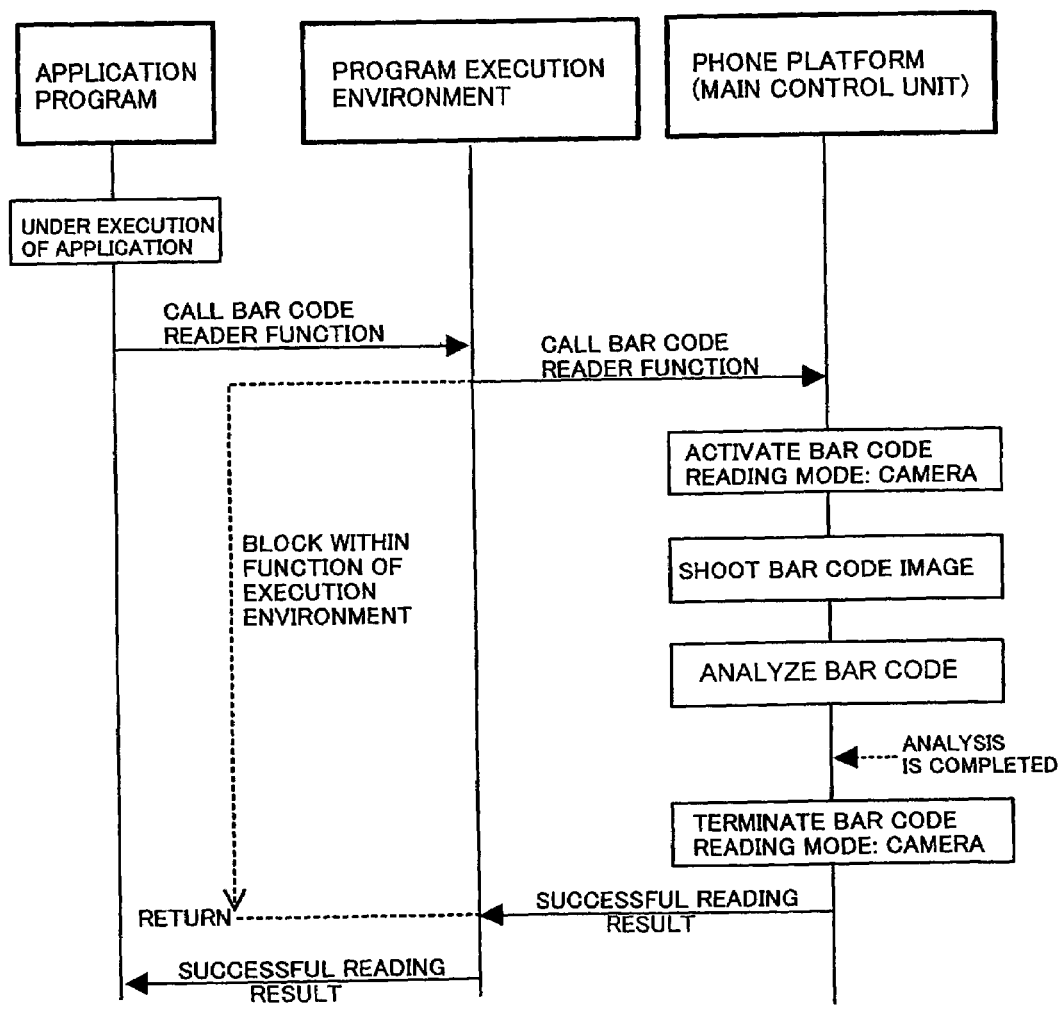

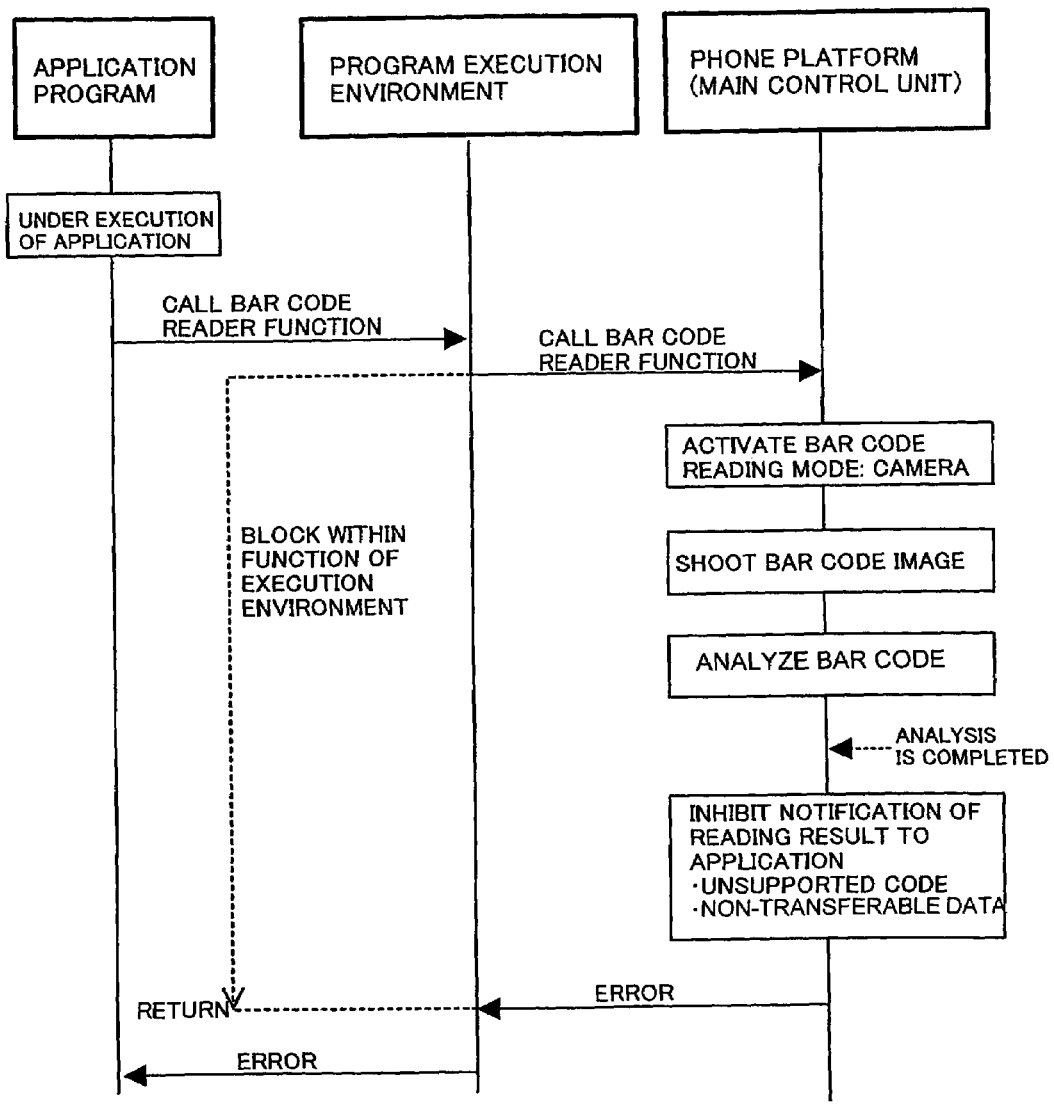
[FIG. 9]

MOBILE COMMUNICATION TERMINAL

TECHNICAL FIELD

The present invention relates to a mobile communication terminal, such as a mobile phone, having a function of shooting a code image and a function of executing an application program registered by a user.

BACKGROUND ART

Conventionally, as this type of a mobile communication terminal, a mobile phone is known that is capable of shooting, with a camera, a code image in which information is coded, analyzing data of the shot code image, and thereby reading the information composed of numbers, symbols, and the like. For the code image, not only a one-dimensional code image such as a bar code, but also a two-dimensional code image (see Patent Document 1, for example) that can contain a large amount of information on the order of several thousand characters through coding is now beginning to be used.

For the aforementioned mobile communication terminal, a mobile phone is known that is capable of executing an application program written in a platform-independent, object-oriented programming language (see Patent Document 2, for example). For example, a mobile phone is known that is provided with JAVA (registered trademark) virtual machine functionality so as to be able to execute an application program written in JAVA (registered trademark). In such a mobile phone, a user downloads his/her desired application program from a server in a mobile communication network and registers the application program on the mobile phone. Then, by the user starting the registered application program, the user can allow a standby screen composed of a three-dimensional moving image to be displayed on a display of the mobile phone, or can play a game, perform fortune-telling, or play music on the mobile phone.

Recently, multi-functional mobile phones having a code-image information reading function of reading information by shooting the aforementioned code image and a function of allowing the user to register and execute the aforementioned application program have become commercially available.

Patent Document 1: Japanese Unexamined Patent Application Publication No. H10-208001

Patent Document 2: Japanese Unexamined Patent Application Publication No. 2000-347867

DISCLOSURE OF THE INVENTION

Problems to be Solved by the Invention

However, in conventional mobile phones having both the code-image information reading function and the application program registering and executing function, programs for implementing the functions start up independently of each other. Thus, there are problems that during the execution of an application program, in response to a request from the program, shooting of the code image and restoring of data from the code image cannot be performed, and a shot code image or restored data cannot be used in the program being executed.

The present invention is made in view of the foregoing problems. An object of the present invention is to provide a mobile communication terminal capable of shooting a code image and restoring data from the code image in response to a request from an application program, and capable of using the shot code image and the restored data.

Means for Solving the Problems

In order to attain the aforementioned object, a mobile communication terminal according to the present invention comprises: image shooting means for shooting images an image; image data memory means for memorizing data of a code image shot by the image shooting means; control means for controlling the image shooting means and the image data memory means; and application program executing means for executing an application program registered by a user, wherein the control means can perform the control based on a control request instruction sent from the application program executing means that is executing the application program.

In the mobile communication terminal, data of a code image shot by the image shooting means is memorized in the image data memory means. On the other hand, an application program registered by the user can be executed by the program executing means. The control means controls the image shooting means and the image data memory means based on a control request instruction sent from the application program executing means, whereby the following processes regarding code image reading are made possible. Specifically, based on the control request instruction, a process of shooting a code image by the image shooting means, a process of memorizing data of the shot code image in the image data memory means, and a process of reading the data of the code image from the image data memory means and passing the read data to the application program executing means are made possible.

Further, it is preferred that the mobile communication terminal further comprises: image data analyzing means for analyzing the data of the code image so that coded data in the code image can be restored; and analysis data memory means for memorizing data of an analysis result obtained from the image data analyzing means, and that the control means is able to control, based on the control request instruction, the image data analyzing means and the analysis data memory means.

In the mobile communication terminal, data analysis is performed by the image data analyzing means so that coded data in a code image shot by the image shooting means can be restored, and data of the analysis result is memorized in the analysis data memory means. The control means controls, based on a control request instruction sent from the application program executing means, the image data analyzing means and the analysis data memory means along with the image shooting means and the image data memory means, whereby the following processes regarding the code image reading are made possible. Specifically, based on the control request instruction, along with a process of shooting and memorizing the code image, a process of analyzing data of the code image, a process of memorizing data of an analysis result, and a process of reading the data of the analysis result and passing the read data to the application program executing means are made possible. Thus, in response to a request from an application program, a code image can be shot, and in addition, data can be restored from the shot code image and the restored data can be used in the application program.

Moreover, in the mobile communication terminal, it is preferred that the control means has plural types of reading control modes used when the code image is shot and data analysis is performed, and select, based on the control request instruction, a reading control mode from the plural types of reading control modes and perform the control based on the selected reading control mode.

In the mobile communication terminal, based on the control request instruction, from plural types of reading control modes used when the code image is shot and data analysis is performed, a reading control mode can be selected and executed. Therefore, a reading control mode that matches a request from an application program can be selected and shooting of a code image and data analysis of the code image can be performed.

Furthermore, the mobile communication terminal is characterized in that the analysis data memory means can memorize data of a plurality of analysis results, and the control means performs the control, based on the control request instruction, such that data selected from the data of analysis results is passed to the application program executing means.

In the mobile communication terminal, data of a plurality of analysis results obtained by reading information by analyzing a plurality of code images that are continuously shot is memorized in the analysis data memory means. The data of a plurality of analysis results memorized in the analysis data memory means can be selectively read based on the control request instruction. Accordingly, among data units of a plurality of analysis results obtained by reading information from a plurality of code images that are continuously shot, only data units of analysis results required by an application program, i.e., only data units of analysis results necessary for the application program can be combined and used.

In the mobile communication terminal, it is preferred that the image data analyzing means has plural types of code recognition processing functions for data analysis of a code image, and performs data analysis on the code image using a code recognition processing function selected from the plural types of code recognition processing functions, and the control means performs the control, based on the control request instruction, such that the code recognition processing function used by the image data analyzing means is selected.

In the mobile communication terminal, a code recognition processing function can be used that is selected, based on the control request instruction, from plural types of code recognition processing functions for data analysis of a code image. Accordingly, even when the type of code image required by an application program is changed, by a code recognition processing function corresponding to the code image, data can be reliably restored from the code image and used.

Moreover, in the mobile communication terminal, it is preferred that the code image has an image portion in which use permission/non-permission information is coded, the information specifying whether to permit a use of the data of the analysis result in the application program, and the control means controls, based on the use permission/non-permission information contained in the data of the analysis result, whether to pass the data of the analysis result to the application program executing means.

In the mobile communication terminal, when the use permission/non-permission information contained in data of an analysis result of a code image is information that inhibits the use of the data in the application program, the data of the analysis result can be controlled such that the data is not passed to the application program executing means. On the other hand, when the use permission/non-permission information is information that permits the use, the data of the analysis result can be controlled such that the data is passed to the application program executing means. By such control based on the use permission/non-permission information in a code image, the use of data of an analysis result of the code image in an application program can be controlled on the creator side of the code image.

Furthermore, in the mobile communication terminal, it is preferred that the control means performs the control such that a plurality of code images are shot and memorized, the images each having an image portion in which binary data into which one of an image file, a sound file, and a program file is split is coded, and then data of a plurality of analysis results composed of the binary data obtained by analyzing data of each code image is passed to the application program executing means.

In the mobile communication terminal, a plurality of code images are shot and memorized, the images each having an image portion in which binary data into which one of an image file, a sound file, and a program file is split is coded. By passing to the application program executing means data of a plurality of analysis results composed of the binary data obtained by analyzing data of each of the code images, by the application program, data of the analysis results can be combined and thereby a file of the image or the like can be restored and used. Thus, during the execution of an application program, data of analysis results can be combined and thereby an image file, a sound file, or a program file can be restored and used.

Note that the aforementioned "mobile communication terminals" include mobile phones of the PDC (Personal Digital Cellular) system, the GSM (Global System for Mobile Communications) system, the TIA (Telecommunications Industry Association) system, and the like, mobile phones standardized by IMT (International Mobile Telecommunications)-2000, mobile phones of the TD-SCDMA (MC: Multi Carrier) system which is one of the TD-SCDMA (Time Division Synchronous Code Division Multiple Access) systems, PHSs (Personal Handyphone Systems), and phones, such as car phones, that are capable of executing application programs. The "mobile communication terminals" also include, in addition to the aforementioned phones, mobile communication terminals with no phone functionality such as PDAs (Personal Digital Assistance).

The aforementioned "code images" include not only images of one-dimensional codes such as a JAN (Japanese Article Number) code and an ITF code, but also images of two-dimensional codes such as a QR (Quick Response) code, a micro QR code, and a PDF417 code.

Control and information processing on the mobile communication terminal can also be realized by allowing a computer provided to the mobile communication terminal to execute a predetermined program. Receiving and passing of a program used on the computer may be performed using a recording medium, such as an FD or a CD-ROM, having recorded thereon a program as digital information, or may be performed using a communication network such as a computer network.

Effects of the Invention

According to the present invention, based on a control request instruction sent from application program executing means, a process of shooting a code image, a process of memorizing data of the code image, and a process of reading the data of the code image and passing the read data to the application program executing means are made possible. Thus, there are advantageous effects in that in response to a request from an application program, a code image can be shot and data analysis can be performed on the shot code image by the application program and used.

BRIEF DESCRIPTION OF DRAWINGS

FIG. 4 is a block diagram showing an extracted main portion of the mobile phone.

FIG. 5 is an illustrative diagram of a software structure to be executed on the mobile phone.

FIG. 7 is an illustrative diagram showing an exemplary data configuration of a QR code.

FIG. 8 is a sequence diagram showing a process of calling a bar-code reader function on a platform side from an application program executed on the mobile phone according to the present embodiment and executing the function.

FIG. 9 is a sequence diagram showing a process performed when a read error occurs in the bar-code reader function.

BEST MODE FOR CARRYING OUT THE INVENTION

An embodiment in which the present invention is applied to a mobile phone serving as a mobile communication terminal will be explained below.

Figure 1:
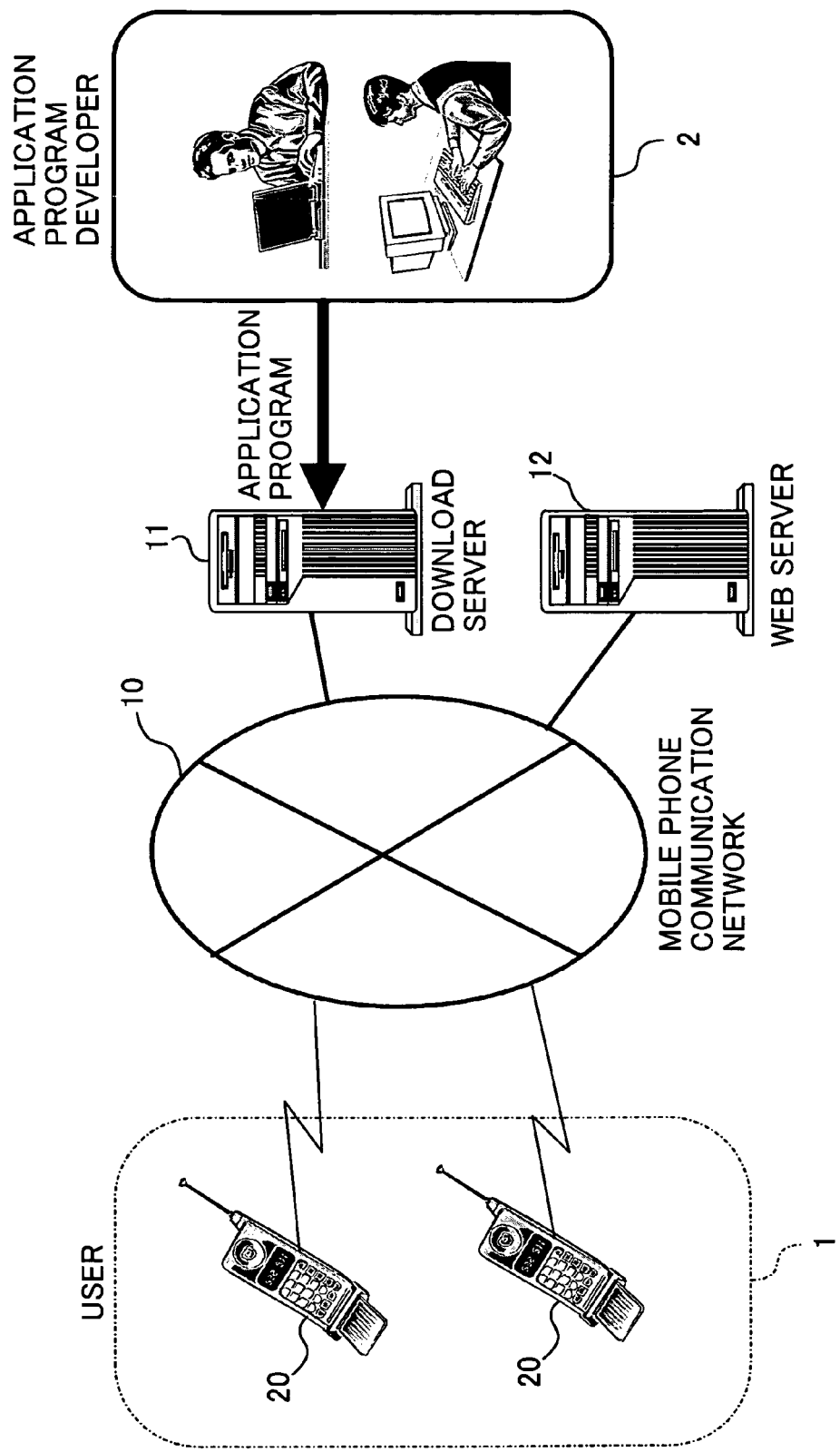
FIG. 1 is an illustrative diagram for explaining the overall configuration of a mobile communication system using a mobile phone according to an embodiment of the present invention, for downloading an application program.

FIG. 1 is an illustrative diagram showing a main portion of a mobile communication system using mobile phones 20 according to the present embodiment. In the mobile communication system, a mobile phone 20 used by a user 1 has a configuration capable of executing application programs developed by platform-independent object-oriented programming. Such application programs include those written in program languages such as JAVA (registered trademark), C, C++, and the like. The execution environment of such application programs can be constructed by middleware such as the virtual machine (VM: Virtual Machine) of JAVA (registered trademark) or BREW (registered trademark). The mobile phone 20 can be connected to a mobile phone communication network 10 serving as a communication network. To the mobile phone communication network 10 are connected an application program download server (hereinafter referred to as the "download server") 11 serving as a program providing server, and a Web server 12. Note that the two servers may be configured as a single server. Note also that the servers 11 and 12 may be configured as dedicated control devices having different configurations, or may be configured using a general-purpose computer system. Alternatively, each of the servers 11 and 12 may be configured using a single computer or may be configured by connecting, via a network, a plurality of computers each having a plurality of functions.

The download server 11 sends, upon receiving a download request from the mobile phone 20, an application program relating to the request, to the mobile phone 20. The Web server 12 sends, upon receiving a browse request from the mobile phone 20, a Web page screen which is a browse screen relating to the request, to the mobile phone 20.

An application program to be provided from the download server 11 is provided from an application program developer 2. Specifically, for example, an application program is uploaded via a leased line or a public line to the download server 11 from a personal computer or the like on the side of the application program developer 2, and thereby the application program is provided. Note that an application program may be provided such that a recording medium, such as an optical disk or a magnetic disk, having recorded thereon a developed application program is sent from the application program developer 2 to a communication common carrier who manages and runs the download server 11 and then the application program on the recording medium is read by the download server 11. The application program thus provided is registered on the download server 11 in a state such that the mobile phone 20 can download the application program via the mobile phone communication network 10.

Figure 2:
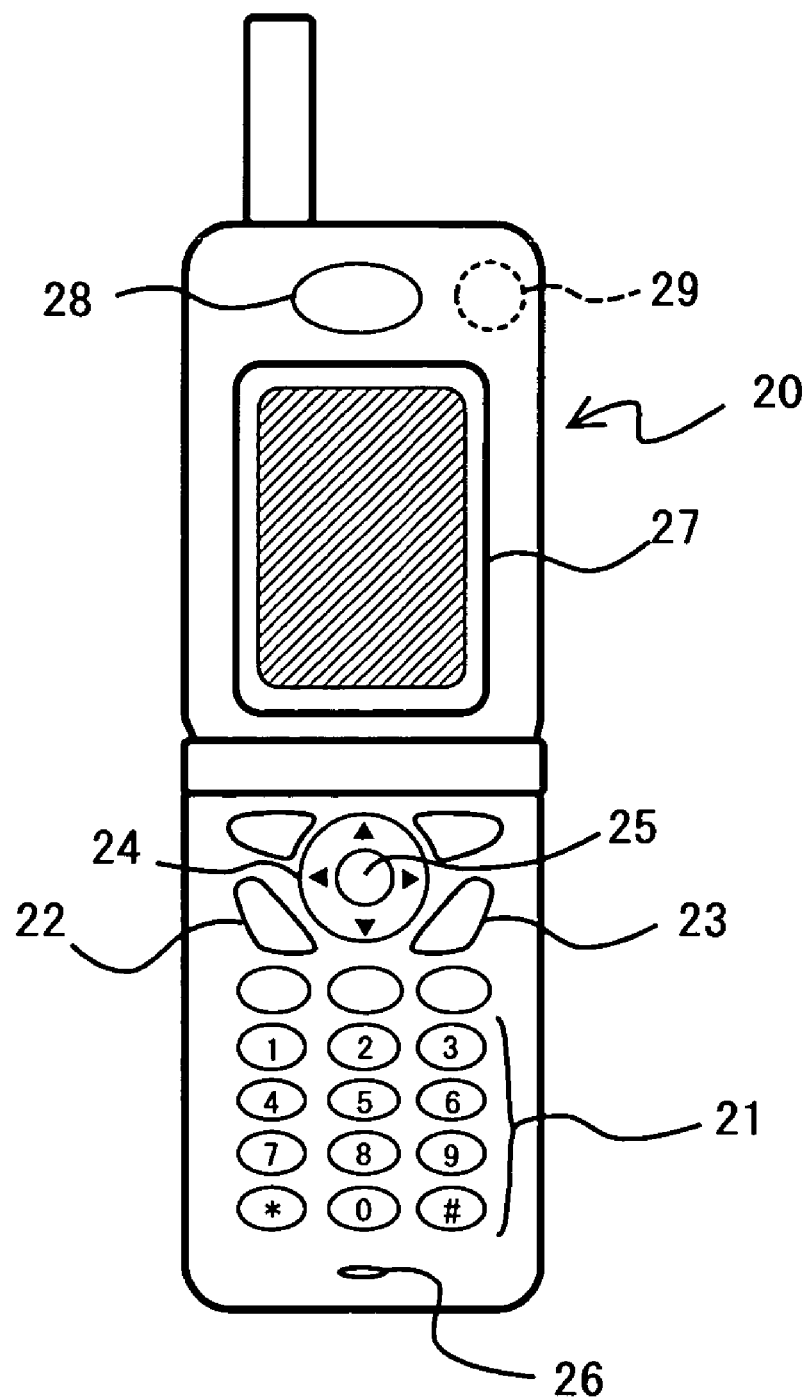
FIG. 2 is an external view of the mobile phone.
Figure 3:
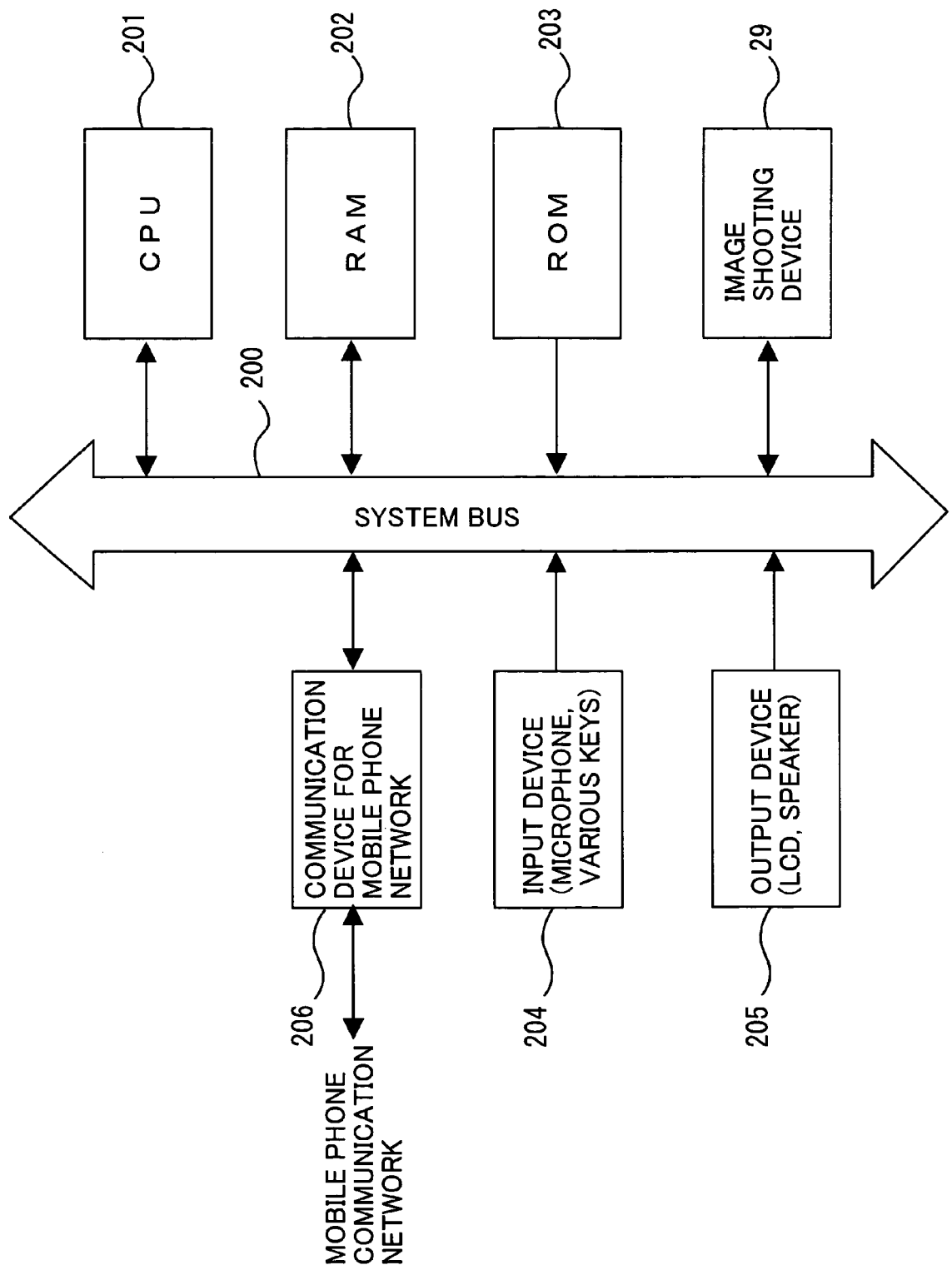
FIG. 3 is a schematic configuration diagram showing a hardware configuration of the mobile phone.

FIG. 2 is an external view of the mobile phone 20 and FIG. 3 is a schematic configuration diagram showing a hardware configuration of the mobile phone 20.

The mobile phone 20 is a clam-shell (folding) type mobile phone, and includes a system bus 200; a CPU 201; data memory means composed of RAM 202, ROM 203, and the like; an input device 204; an output device 205; a communication device 206 for a mobile phone; and an image shooting device 29 serving as image shooting means. The components such as the CPU 201 and the RAM 202 exchange with each other various data, instructions of a program which will be described later, etc., via the system bus 200. The input device 204 is composed of data entry keys (a numeric keypad, a * key, and a # key) 21, a call start key 22, a call end key 23, a scroll key 24, a multifunction key 25, a microphone 26, and the like. The output device 205 is composed of a liquid crystal display (LCD) 27 serving as image display means, a speaker 28, and the like. The communication device 206 for a mobile phone communication network establishes communication with other mobile phones or the servers 11 and 12 via the mobile phone communication network 10.

The image shooting device 29 is provided on the back side which is on the opposite side of the front side where there is the liquid crystal display (LCD) 27, and a CCD (Charge Coupled Device) camera or a CMOS camera can be used for the image shooting device. Depending on the use environment, it is also possible to use an artificial retina camera with a signal processing function which enables fast shooting, or a camera having a sensitivity in a wavelength range other than visible light such as infrared rays or gamma rays. The image shooting device 29 is used to shoot an image of people, a landscape, and the like, or to shoot a code image, as will be described later, by a close-up function.

FIG. 4 is a block diagram showing an extracted main portion of the mobile phone 20, and FIG. 5 is an illustrative diagram of a software structure of the mobile phone 20.

The mobile phone 20 includes a phone communication unit 211, a data communication unit 212, an operating unit 213, an application program executing and managing unit 214 serving as application program execution means, a main control unit 215 serving as control means, and an output unit 216. In addition, the mobile phone 20 includes an image shooting unit 217 having the image shooting device 29 serving as image shooting means, a data analyzing unit 218 serving as data analysis means and functioning as a recognition engine, and a data memory unit 219 serving as image data memory means and analysis data memory means.

The phone communication unit 211 performs radio communication with a base station of the mobile phone communication network 10 to perform phone communication with another mobile phone or a fixed-line phone. The phone communication unit 211 corresponds to the communication device 206 for a mobile phone communication network, etc., in the aforementioned hardware configuration.

The data communication unit 212 corresponds to the communication device 206 for a mobile phone communication network, etc., in the aforementioned hardware configuration, as in the phone communication unit 211. The data communication unit 212 exchanges e-mails with other mobile phones via the mobile phone communication network 10, or establishes a connection to an external communication network, such as the Internet, from the mobile phone communication network 10 via a gateway server and exchanges e-mails on the Internet or browses Web pages that are distributed by the Web server 12. The data communication unit 212 is also used to download, via the mobile phone communication network 10, an application program that is provided by the download server 11.

The operating unit 213 includes the numeric keypad 21, the call start key 22, the call end key 23, and the like, which can be operated by the user 1. By operating the operating unit 213, the user can input data, such as a URL, to the mobile phone 20, start and end a call upon incoming call, or select, start, and stop an application program. Further, by the user operating the operating unit 213, the user can download and register an application program from the download server 11, or select and execute the registered application program. Moreover, by operating the operating unit 213, the user can take a picture of the code image.

The application program executing and managing unit 214 includes the system bus 200, the CPU 201, the RAM 202, and the like. The application program executing and managing unit 214 corresponds to the "program execution environment" shown in the center of the software structure in FIG. 5. The application program executing and managing unit 214 provides software, such as a class library, an execution environment management library, and an application management, which is used for an application program developed by object-oriented programming, and manages the execution environment of the application program.

The application program can call and use a class library of functions, etc. in the aforementioned program execution environment, via a class library API (application interface). The history of calling the class library of functions, etc., is held until a virtual execution environment (virtual machine: VM) for the application program is terminated.

The execution environment management library in the program execution environment can call and use a phone platform library in a phone platform via a phone platform API, as will be described later.

The main control unit 215 controls the phone communication unit 211, the data communication unit 212, the operating unit 213, the application program executing and managing unit 214, the output unit 216, the image shooting unit 217, the data analyzing unit 218, and the data memory unit 219. The main control unit 215 includes the system bus 200, the CPU 201, the RAM 202, and the like.

In addition, the main control unit 215 exchanges control instructions or various data with the application program executing and managing unit 214, the image shooting unit 217, the data analyzing unit 218, the data memory unit 219, and the like, and performs control in cooperation with these units. The main control unit 215 corresponds to the "phone platform" shown at the bottom of the software structure in FIG. 5. The main control unit 215 executes a control program for controlling the phone communication unit 211 or the like, and a user interface, or provides a phone platform library. The phone platform can execute various processes in an application program by sending an event to the execution environment management library in the program execution environment, or can call, via an application management API, software of the application management in the program execution environment and use the software.

The output unit 216 includes, for example, the output device 205 composed of the liquid crystal display (LCD) 27, the speaker 28, and the like. The output unit 216 is used to display a Web page screen received by the data communication unit 212 on the liquid crystal display (LCD) 17, or to notify the user that incoming information is received by the phone communication unit 211 or the data communication unit 212. Specifically, when receiving such information, the main control unit 215 allows an incoming-information notification image to be displayed on the liquid crystal display (LCD) 17 of the output unit 216, or allows a ring tone to be outputted from the speaker 18. The output unit 216 is also used to perform a display of an image or an output of sound during the execution of an application program such as the aforementioned game, wherein the image and sound is related to the program execution. The output unit 216 is also used to display a code image shot by the image shooting unit 217, or to display information read by analyzing data of the code image.

The image shooting unit 217 is composed of the image shooting device 26 and the like, and is used to take a picture of people or a landscape, or to shoot a code image. The image shooting unit 217 is located in the "phone platform" shown at the bottom of the software structure in FIG. 5 and the basic operation is controlled by a control program which is installed in advance by a manufacturer.

The data analyzing unit 218 is composed of the system bus 200, the CPU 201, the RAM 202, and the like, and has a code recognition processing function (recognition engine) for data analysis of a code image. Using the code recognition processing function, the data analyzing unit 218 performs data analysis on a code image shot by the image shooting unit 217. The data analyzing unit 218 may be configured to have plural types of code recognition processing functions and perform data analysis on a code image using a code recognition processing function (recognition engine) selected from the plural types of code recognition processing functions. In the present embodiment, the data analyzing unit 218 has two types of code recognition processing functions (recognition engines) corresponding to a JAN code and a QR code, respectively, and performs data analysis on a code image by switching these functions.

The data memory unit 219 is composed of the RAM 202, the ROM 203, and the like, and memorizes data of a code image shot by the image shooting unit 217 and data of an analysis result obtained from the data analyzing unit 218.

A control program for constructing a phone platform which allows the mobile phone 20 to operate in accordance with a predetermined procedure is memorized in the RAM 202 or the ROM 203. In addition, a basic OS (operating system) program, a program for constructing the program execution environment, and an application program are also memorized in the RAM 202 or the ROM 203. These programs are called, when necessary, in a work area of the CPU 201 or of the RAM 202 and executed.

In the mobile phone 20 having the aforementioned configuration, to download an application program from the download server 11, the user 1 operates the keys of the operating unit 213 to access the download server 11. By this operation, a download selection screen for selecting a downloadable application program is displayed on the display 17.

Then, on the download selection screen, the user 1 selects his/her desired application program using the scroll key 14, and presses the multifunction key 15, whereby the main control unit 215 controls the data communication unit 212 and downloads the application program from the download server 11.

Specifically, in the present embodiment, an application program consists of a JAD file (text data) that contains property information and a JAR file (binary data) that contains the main body of the program. The JAD file contains not only basic data such as an application name, an application version, an application's vendor name, and data of a URL indicating where the JAR file is stored, but also setting data indicating, for example, whether the application program is authenticated, whether the application program is used being connected to a network, or whether the application program is a resident application program. In addition, the JAD file also contains the URL (the address data of the distributor) of the official Web page where relevant information regarding the application program is disclosed. When the user's desired application program is selected on the download selection screen, the main control unit 215 controls the data communication unit 212, and first downloads only a JAD file in the application program. Thereafter, the main control unit 215 reads from the JAD file data of a URL indicating where a JAR file is stored, accesses the URL, and downloads the JAR file. The application program consisting of the JAD and JAR files thus downloaded is memorized in the RAM 102 by the main control unit 215.

When executing the application program thus downloaded, the user 1 operates the keys of the operating unit 213 to allow an application selection screen for selecting an application program to be executed, to be displayed on the display 17. On the application selection screen, by the user selecting his/her desired application program using the scroll key 14, and pressing the multifunction key 15, the application program executing and managing unit 214 reads the JAR file and starts the application program. Here, if necessary, the setting data of the JAD file may be referred to and an environment that performs a processing operation in accordance with the setting data may be set. When a particular processing operation is performed during the execution of the application program, the setting data of the JAD file regarding the processing operation is referred to, and a processing operation suitable for the application program is performed. The application programs include various application programs; for example, an application program that allows a user to enjoy a game, etc., by operating various keys of the operating unit 213, and a resident application program that allows a standby screen composed of a three-dimensional moving image to be displayed on the display 17.

Figure 6A:
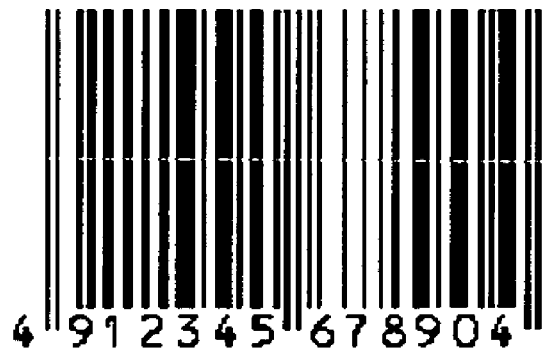
FIG. 6A is an illustrative diagram showing a code image that can be read by the mobile phone.
Figure 6B:
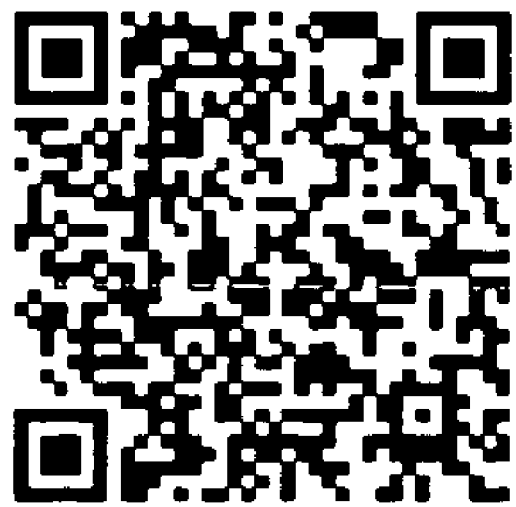
FIG. 6B is an illustrative diagram showing another code image that can be read by the mobile phone.

FIG. 6A and FIG. 6B each show a code image that can be read by the mobile phone 20 according to the present embodiment. FIG. 6A shows an example of an image of a 13-digit JAN (Japanese Article Number) code that complies with JIS standard (JIS-X-0501), which represents a one-dimensional code symbol. FIG. 6B shows an example of an image of a QR (Quick Response) code that complies with JIS standard (JIS-X-0510), which represents a two-dimensional code symbol.

Particularly, the QR code has advantages in that the QR code can contain, through coding, a large amount of information on the order of 7000 numeric characters or the order of 1800 Chinese characters, and has an error correction function that allows information to be correctly read even if there is some stain or damage to the code.

FIG. 7 is an illustrative diagram showing an exemplary data configuration of a QR code. In this example, a header part has extension header components after a "mode indicator" and an "indicator for the number of characters" which are standard header components. The "mode indicator" is an identifier indicating which mode a data sequence is coded in. The "indicator for the number of characters" indicates the total number of characters including the extension header components.

The extension header components include an "extension header identifier," a "maker identifier," a "QR-code extended version identifier," an "encryption identifier," an "encryption algorithm version identifier," and a "copyright identifier." The "extension header identifier" indicates whether there is an extension header. The "maker identifier" defines an identifier of the maker of a QR code creation tool. The "QR-code extended version identifier" defines the version of an extension of the QR code. The "encryption identifier" defines the identification of encryption or non-encryption. The "encryption algorithm version identifier" defines the version of an algorithm necessary for decryption. The "copyright identifier" defines whether to store/transfer media data included in the entire data.

Data components follow the extension header components. A data component is configured with a "data type identifier," a "data length," and a "data body" to be one set. The "data type identifier" defines the type of data such as no-display of a URL (S-JIS), a text (S-JIS), a binary, SMD, SMAF, PNG, JPEG, or EVA. The "data length" indicates a data length (bytes) for each data type. Finally, an "end pattern" is provided.

Next, the operations performed when a code image is shot and information is read from the code image in cooperation with an application program will be described, which are the characteristic parts of the present invention.

FIG. 8 is a sequence diagram showing a process of calling from an application program a function (hereinafter referred to as a "bar-code reader function") of shooting a code image and reading information from the code image, which is present on the platform side, and executing the function.

The user obtains an application program by downloading the application program from the download server 11, or by purchasing a mobile phone 20 in which the application program is registered in advance. The user can select his/her desired application program from an application program list and execute the selected application program.

During the execution of the application program, based on the execution content, a reading control mode is specified and a bar-code reader function is called. When this call is made, the application program executing and managing unit 214 that constructs the application execution environment outputs a control request instruction to call the bar-code reader function, along with mode specification information that specifies the reading control mode, to the main control unit 215 on the platform side. The main control unit 215 having received the control request instruction selects, from a plurality of reading control modes set in advance, a reading control mode that corresponds to the mode specification information, and executes the selected mode. For the reading control modes, for example, the following reading control modes can be selected. When a reading control mode without specification of a one-dimensional code or a two-dimensional code is selected, the user may be allowed to make a selection between the one-dimensional code and the two-dimensional code, or the data analyzing unit (recognition engine) 218 may automatically recognize either the one-dimensional code or the two-dimensional code.

(1) Only a single reading of a one-dimensional bar code (JAN code)

(2) Continuous readings of one-dimensional bar codes (JAN codes)

(3) Only a single reading of a two-dimensional code (QR code)

(4) Continuous readings of two-dimensional codes (QR codes)

(5) Only a single reading without specification of a one-dimensional code or a two-dimensional code When the bar-code reader function is called, without suspending the application program, the application program is left in a block state within a function of the application execution environment, and the image shooting device (camera) 29 of the image shooting unit 217 is activated in the specified reading control mode. When this activation is performed, the image shooting device 29 is inhibited from transitioning to a normal camera mode, and an icon display that indicates the execution state of the application provides a dummy suspension icon.

After the activation of the image shooting device (camera) 29, a code image is shot and data analysis is performed on the shot code image, by the same operation as that of the normal bar-code reader function on the platform. Data of the analysis result showing information read by the data analysis is temporarily stored in the data memory unit 219.

When the data analysis of the code image is completed, the main control unit 215 ends the bar-code reader function without displaying the data of the analysis result, and passes the data successfully read to the application program executing and managing unit 214. The application program executing and managing unit 214 cancels the block state and automatically resumes the execution of the application program. When the application program is returned, the data of the analysis result stored in the data memory unit 219 is read and passed to the application program executing and managing unit 214, whereby the application program can use the data. Here, if the main control unit 215 determines, by referring to the copyright identifier present in the extension header part of the data of the analysis result, that the data of the analysis result is data (e.g., copyrighted data) that should not be notified to the application program, the main control unit 215 notifies error information, as will be described later, to the application program executing and managing unit 214 instead of transferring the data of the analysis result.

The application program executing and managing unit 214 always holds the latest analysis result data unit obtained from the main control unit 215. The application program executing and managing unit 214 deletes data previously obtained, when obtaining new analysis result data. The last obtained analysis result data is deleted when the application program is ended. Thus, even if reading of a code image is performed by a user operation during the suspension of the application program, analysis result data saved in heap memory of the application program executing and managing unit 214 remains held.

When a two-dimensional code (QR code) is read, the application side can confirm whether the read code is a normal code or an extension code. Analysis result data for the extension code includes the aforementioned "QR-code extended version identifier," "data type identifier," "data length," and "data."

In the present embodiment, in both the normal and extension codes, regardless of what format the code is written in, an analysis result is passed, as binary data, to the application program executing and managing unit 214. Then, the analysis result of the QR code is analyzed and determined by the application program. Thus, data analysis does not need to be performed by either the application program executing and managing unit 214 and the main control unit 215 on the platform side.

When the read data is split, the main control unit 215 on the platform side performs a combining process on the split data, and then the data is returned to the application program. Note, however, that when transfer is disabled in the extension header, an error is notified to the application program.

When continuous readings are performed, the main control unit 215 on the platform side notifies the application program executing and managing unit 214 of the number of data units read. It is also possible to notify that the n-th data unit is read. For example, when QR codes are continuously read five times in a continuous reading mode and thereafter three split data segments are read in a concatenation mode, the three split data segments are combined and treated as a single QR code data unit, resulting in reading six data units. Here, upon obtaining the result of the sixth data unit, the result for the combined three split data segments is notified.

FIG. 9 is a sequence diagram showing a process performed when a read error occurs in the bar-code reader function. If it is determined that an error has occurred as a result of the main control unit 215 executing a reading control mode, the main control unit 215 notifies error information to the application program executing and managing unit 214. The application program executing and managing unit 214 having received the notification of error information deletes previous analysis result data held in the heap memory. Note that the error information is notified in the following cases, for example.

(1) When reading is aborted by user cancel.

(2) When notification cannot be made to the application (reading of an unsupported code or non-transferable data), though reading is performed.

(3) When reading cannot be performed due to the expiration of a timer.

When the bar-code reader function is interrupted by the pressing of a power-on key or a clear key, the ending of a voice incoming call, or the like, during the execution of the reading control mode, an error is notified to the application. At this point, without returning to a standby screen, the application program is automatically resumed and returned.

In a state of "the application being blocked or the bar-code reader being activated" upon calling the bar-code reader function from the application, a voice incoming call, an e-mail reception, WebPush, and an information providing service reception are received on the platform side and are not notified to the application side. When a resident application is set for standby, similarly, they are received on the platform side.

As described above, according to the present embodiment, in response to a request from an application program, a code image can be shot, data can be restored from the shot code image, and the restored data can be used in the application program.

According to the present embodiment, according to the execution content of an application program, a suitable reading control mode can be selected from a plurality of reading control modes, and shooting of a code image and data analysis of the code image can be performed.

Furthermore, according to the present embodiment, among a plurality of analysis result data units obtained by reading information from a plurality of code images that are continuously shot, only analysis result data units necessary for the application program can be combined and used.

According to the present embodiment, even when the type of code image used in an application program is changed, by a code recognition processing function corresponding to the code image, data can be reliably restored from the code image and used.

Moreover, according to the present embodiment, by control based on use permission/non-permission information contained in a code image (e.g., the copyright identifier in the extension header), the use of analysis result data of the code image in an application program can be controlled on the creator side of the code image.

According to the present embodiment, during the execution of an application program, an image portion of a code image corresponding to binary data can be analyzed and an image or sound file can be restored and used.

Although in the aforementioned embodiment an analysis result of a code image is passed from the main control unit 215 on the platform side to the application program executing and managing unit 214, data of a code image shot by the image shooting unit 217 may be passed as it is. In this case, since a shot code image can be analyzed by the application program and data can be restored, when a code image of a new type is used, by the user changing the type of application program, information can be read from the code image of a new type and used. Accordingly, reading of information about a code image of a new type is made possible and the code-image information reading function can be easily enhanced.

Although the preferred embodiment of the present invention has been explained, it is understood that various modifications may be made to the embodiment disclosed herein without departing from the scope or spirit of the present invention, and within the scope of the technical ideas as set forth in the appended claims.

For example, although the aforementioned embodiment explains a mobile phone that can execute an application program developed by platform-independent object-oriented programming using a programming language such as JAVA (registered trademark), the present invention can be applied without being limited to the type of application program to be executed on the mobile phone, and the same advantageous effects can be obtained.

In addition, the present invention can be applied to any apparatus as long as the apparatus can execute application programs and can shoot code images, and thus can be applied not only to phones, such as PHSs and car phones, but also to portable PDAs, and the same advantageous effects can be obtained.

The invention claimed is:

1. A mobile communication terminals comprising:
    image shooting means for shooting an image;
    image data memory means for storing data of a code image shot by said image shooting means;
    image data analyzing means for analyzing the data of the code image to obtain code data from the code image;
    control means for controlling at least one of: said image shooting means, said image data analyzing means and said image data memory means; and
    application program executing means for executing an application program using the code data,
    wherein said control means controls the at least one of: said image shooting means, said image data analyzing means and said image data memory means based on a control request instruction sent from said application program executing means that is executing the application program, wherein the control request instruction corresponds to the code data,
    and wherein execution of the application program by the application program executing means is placed in a blocked state upon the sending of the control request instruction, the blocked state being cancelled and execution of the application program resumed upon receipt of a notification from the control means.

2. The mobile communication terminal according to claim 1, further comprising:
    analysis data memory means for storing data of an analysis result obtained from said image data analyzing means,
    wherein said control means can control said image data analyzing means and said analysis data memory means along with said image shooting means and said image data memory means, based on the control request instruction.

3. The mobile communication terminal according to claim 1, wherein said control means includes plural types of reading control modes used when the code image is shot and data analysis is performed, and selects, based on the control request instruction, a reading control mode from the plural types of reading control modes and performs the control based on the selected reading control mode.

4. The mobile communication terminal according to claim 2, wherein
    said analysis data memory means stores data of a plurality of analysis results, and
    said control means performs the control so that data of the analysis results is read from said analysis data memory means and the data is passed to said application program executing means, based on the control request instruction.

5. The mobile communication terminal according to claim 1, wherein
    said image data analyzing means has plural types of code recognition processing functions for data analysis of a code image, and performs data analysis on the code image using a code recognition processing function selected from the plural types of code recognition processing functions, and
    said control means performs the control so that the code recognition processing function is selected based on the control request instruction.

6. The mobile communication terminal according to claim 1, wherein
    the code image has an image portion in which use permission/non-permission information is coded, the information specifying whether to permit a use of the data of the analysis result in the application program, and
    said control means determines whether to pass the data of the analysis result to said application program executing means, based on the use permission/non-permission information contained in the data of the analysis result.

7. The mobile communication terminal according to claim 1, wherein said control means performs the control so that a plurality of code images are shot and stored, the images each having an image portion that includes binary data coded for at least one of an image file, a sound file, and a program file, and then data of a plurality of analysis results composed of the binary data obtained by analyzing data of each code image is passed to said application program executing means.

8. A mobile communication terminal, comprising:
    an imaging device that obtains a code image;
    a memory coupled to the imaging device that stores the code image;
    an analyzer coupled to the memory that analyzes the code image and obtains code data from the code image;
    a processor coupled to the analyzer that executes an application program, wherein the processor executes the application program using the code data; and a controller coupled to at least one of: the imaging device, the memory and the analyzer, wherein the controller controls the at least one of: the imaging device, the memory and the analyzer according to information received from the application program, wherein the information corresponds to the code data, and wherein execution of the application program by the processor is placed in a blocked state upon sending the information from the application program, the blocked state being cancelled and execution of the application program resumed upon receipt of a notification from the controller.

9. The mobile communication terminal according to claim 8, wherein the application program is stored in the memory.

10. The mobile communication terminal according to claim 8, wherein the code image is analyzed by the analyzer according to information provided to the analyzer by the application program.

11. The mobile communication terminal according to claim 8, further comprising:
a display that displays information received from the application program corresponding to the code data.

12. The mobile communication terminal according to claim 8, further comprising:
a communication device, wherein the communication device provides communication between the mobile communication terminal and a mobile phone network.

13. The mobile communication terminal according claim 8, wherein the code data includes permission/non-permission information specifying a permitted/non-permitted use of the code data by the application program.

14. The mobile communication terminal according to claim 13, wherein the application program is provided to the mobile telecommunications terminal via the mobile phone network using the communication device.

15. The mobile communication terminal according to claim 8, wherein the controller performs a plurality of code images to be obtained and stored, wherein each code image includes an image portion that includes code data for at least one of: an image file, a sound file, and a program file.

16. A method of operating a mobile communication terminal, comprising:
obtaining a code image using an imaging device of the mobile communication terminal;
storing the code image in a memory of the mobile communication terminal;
analyzing the code image to obtain code data from the code image;
executing an application program using the code data obtained from the code image; and
controlling at least one of: the obtaining of the code image, the storing of the code image and the analyzing of the code image according to information from the application program, wherein the information corresponds to the code data, and wherein execution of the application program is placed in a blocked state upon sending the information from the application program, the blocked state being cancelled and execution of the application program resumed upon receipt of a notification.

17. The method according to claim 16, further comprising:
selecting a control mode based on the information sent from the application program, wherein the control mode is selected from a plurality of types of control modes that correspond to at least one of: the obtaining of the code image, the storing of the code image and the analyzing of the code image.

18. The method according to claim 16, wherein the code image is analyzed according to information provided by the application program.

19. The method according claim 16, wherein the code data includes permission/non-permission information specifying a permitted/non-permitted use of the code data by the application program.

20. The method according to claim 16, wherein controlling at least one of: the obtaining of the code image, the storing of the code image and the analyzing of the code image includes obtaining and storing a plurality of code images, wherein each code image includes an image portion that includes code data for at least one of: an image file, a sound file, and a program file.

21. The mobile communication terminal according to claim 1, wherein the notification includes at least one of: analysis result data and error information.

22. The mobile communication terminal according to claim 8, wherein the notification includes at least one of: analysis result data and error information.

23. The method according to claim 16, wherein the notification includes at least one of: analysis result data and error information.

* * * * *

UNITED STATES PATENT AND TRADEMARK OFFICE
CERTIFICATE OF CORRECTION

| | | |
|---|---|---|
| PATENT NO. | : 7,583,285 B2 | Page 1 of 1 |
| APPLICATION NO. | : 10/557287 | |
| DATED | : September 1, 2009 | |
| INVENTOR(S) | : Otaka et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 494 days.

Signed and Sealed this

Fourteenth Day of September, 2010

David J. Kappos
*Director of the United States Patent and Trademark Office*